Dec. 23, 1952     B. RONAY     2,623,148

WELDING JOINT AND BACKING THEREFOR

Filed July 24, 1951

INVENTOR

BELA RONAY

BY *[signatures]*

ATTORNEYS

Patented Dec. 23, 1952

2,623,148

UNITED STATES PATENT OFFICE 2,623,148

WELDING JOINT AND BACKING THEREFOR

Bela Ronay, Glen Burnie, Md.

Application July 24, 1951, Serial No. 238,357

7 Claims. (Cl. 219—10)

(Granted under the act of March 3, 1883, as amended April 30, 1928; 370 O. G. 757)

The invention described herein may be manufactured and used by or for the Government of the United States of America for governmental purposes without the payment of any royalties thereon or therefor.

This invention relates to a welding joint and a backing used in making such a joint. More particularly this invention relates to improved butt welding of joints in pipe or tubing.

In pipe or tube butt welding operations it is always desirable to obtain a finished joint which is strong and wherein the interior of the pipe or tube is not unduly obstructed by melted down particles of metal. Strength is obviously required to prevent failure of the pipe or tube under stress. Also a relatively smooth, not unduly restricted, interior surface is desirable to permit smooth fluid flow therein and also to permit the unhindered passage of pipe cleaning devices therethrough.

In simple butt welding of pipe it is impossible to secure good fusion of the root of the weld without melting the material at the root of the weld and such melting is practically always accompanied by uncontrollable deformation of the root metal, such deformation taking place inwardly so that the cross section of the pipe is constricted excessively at such a joint. In many cases the root metal may melt to such an extent as to actually drop into the pipe forming "icicles." Obstructions thus produced in the pipe offer an impediment to fluid flow through the pipe which can be more or less serious depending upon the relative amount of cross-sectional area obstructed. Such obstruction to fluid flow is particularly bad if an attempt is made to use rotary cleaning devices of the type ordinarily used periodically in long distance pipe lines because a cleaning device may actually become lodged at such a restricted joint requiring dismantling of the piping to permit its removal.

Partly as a result of my Patent 2,188,925 entitled "Welding Joint and Chill Ring Therefor" issued February 6, 1940, it has now become quite widespread to employ a temporary backing ring which is placed inside the pipe in the region of the butt-weld to support the metal of the pipe ends while they are being welded and to prevent a reduction in pipe cross section. Such a temporary backing is of such composition that it may be readily removed or destroyed after it has served its purpose. In the aforementioned patent the backing was composed of a mixture of a refractory material and a combustible material molded into the shape of a thick washer of sufficient diameter to fit snugly within the pipe end. Such a washer is strong enough to be handled and to support molten metal. However, after being subjected to the heat of welding, the combustible material volatizes leaving a porous residue which, although it is still capable of supporting molten metal, is readily shattered under blows by the clipping hammer on the outside of the pipe. The shattered residue is then easily removed from the pipe by a current of fluid.

With the passage of time certain modifications of the basic idea of the aforementioned patent have been discovered which, although they do not detract in any way from the merits of the original patent, do extend its usefulness permitting even better welded joints than hitherto possible.

An object of the present invention is to provide butt-welded pipe-joints with excellent fusion and an internal strengthening "bead" at the root of the weld, said bead having selected dimensions.

It is an object of the present invention to provide an improved welded joint having the roots of the joint completely fused together and having a substantially smooth interior surface which will not materially obstruct flow therethrough.

Another object of the present invention is to provide a joint backing material which prevents the uncontrolled entry of molten metal into the pipe during the welding process and which provides proper relative spacing of the ends of pipe to be welded to obtain optimum fusion.

Other and further objects and features of the present invention will become apparent upon a careful consideration of the following detailed description and the accompanying drawing wherein the figures are on different scales.

In accordance with the basic features of the present invention, a welding joint is provided for a hollow member, such as pipe, tubing or the like, wherein a backing material is placed near beveled ends to be welded to control the extent to which molten material can enter the hollow space inside the member.

Figure 1:
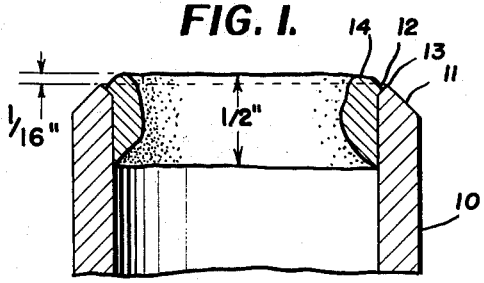
Fig. 1 shows in cross section an end of a pipe with the backing in place.

With particular reference now to Fig. 1, there is shown a specfic application of the invention to a pipe, it being understood that the principles of the invention are of broader application.

In Fig. 1, an end of a pipe 10 is to be connected by welding to another similar end of pipe. This pipe has a double bevel or taper end thereof, that is an outer bevel or taper 11 and an inner bevel or backward taper 12. As shown in Fig. 1, these two bevels are thus cut convexly to such an extent that a feather edge 13 results. Proportioning of the bevels which are typically cut at 45-degree angles to the pipe axis may be such that the feather edge is displaced from the inner surface of the pipe by approximately half the thickness of a normal bead for the metal thickness employed. Typically for pipe walls of 1/8" thickness or greater this displacement may be 1/16" from the inside of the pipe (measured radially).

Affixed to the end of pipe 10 in the beveled region thereof and on the inside of the pipe is a welding backing 14. Typically backing 14 may be composed of a metallurgically inert refractory such as refractory moulding sand, Alundum or silica sand together with a plastic binder composed of an acetone base thermoplastic such as "Duco" cement added in sufficient quantities to render the mixture of a putty-like consistency. By way of example, this backing may be composed of 90–95 weight percent silica sand and 5–10 weight percent "Duco" cement. The mixture is applied to the interior of the pipe at the ends to be welded in more or less the shape indicated in Fig. 1, projecting approximately 1/16" beyond the end of the pipe and having a width of approximately 1/2" and a thickness of approximately 1/4".

The mixture thus applied will harden without further treatment in several hours' time; however the application of a moderate amount of indirect heat thereto will hasten solidification.

After the backing 14 is applied and hardens, the projecting portion is then cut back to where it projects uniformly beyond the end of the pipe by a distance typically equal to 3/64". Additionally the backing 14 is relieved in the region of the inner bevel so that it provides an end portion having a smaller diameter than the inside diameter of the pipe. The cutting of the backing 14 to shape may be performed by any suitable means or mechanism or manually. If desired it may be facilitated and performed with greater accuracy by means of the apparatus disclosed in my copending application entitled, "Shaping Device," S. N. 238,358, filed July 24, 1951.

In some instances it may be desirable to shape the backing to the desired end form before it hardens. If such is the case a suitable mould may be placed at the end of the pipe after the backing is applied to press the backing to desired shape.

Figure 2:
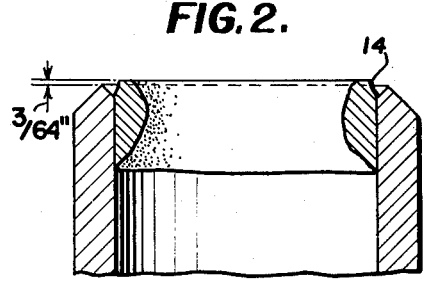
Fig. 2 shows another cross section view of an end of a pipe with the backing in place.

A finished pipe end ready for welding is shown in Fig. 2. As indicated therein the backing 14 is of an annular nature projecting beyond the end of the pipe by 3/64".

Figure 3:
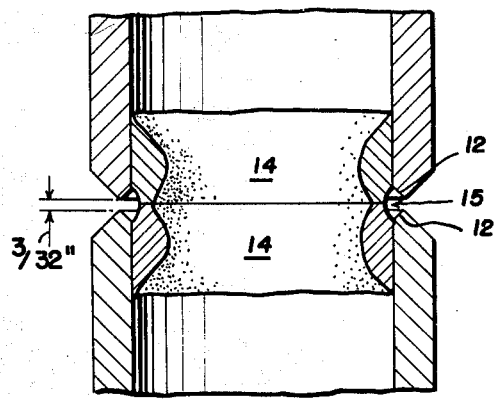
Fig. 3 shows in cross section, two ends of pipes butted together for welding.

In Fig. 3 two pipe ends such as shown in Fig. 2 have been butted together and as shown are ready for welding. The pipe ends are spaced by the projections of the backing 14 so that the spacing is 3/32". With the two ends thus placed together, the relief of the backing 14 cooperates with the inner bevels 12 of the pipe ends to form an annular cavity 15.

In welding the joint shown in Fig. 3, it is generally preferable that the joint be built up in multiple process or layers in which case the weld is started by directing heat at the feather edges of the pipe ends. As weld metal is added from the welding rod, the annular cavity 15 between the feather edges and the backing 14 is filled by weld metal and good fusion of the inner surface of the pipe is obtained. Fusion is improved by the controlled "bead" provided on the inside of the pipe at the root of the weld as a result of the cut-away portion of the backing 14.

Such controlled interior beading would be impossible but for the fact that in the arrangement herein specified, the backing 14 is protected from direct welding heat by the feather edges of the pipe. Such a degree of protection is afforded the backing 14 that even electric arc welding can be used with entire satisfaction, the feather edges themselves catching the intense heat of the arc while the backing 14 receives only the heat of the molten metal. The compositions previously specified are capable of withstanding this heat for the relatively short time required for making the first pass in welding because the thermoplastic bond of the relatively large backing mass is not volatilized completely upon such short exposure. During subsequent welding passes or in the prolonged heat of the stress relieving process normally employed after welding thick-walled pipe or tubing, the thermoplastic binder is vaporized so that the backing 14 disintegrates. After the first pass the backing 14 is no longer required because the metal left in the first pass is then hard and capable of retaining the molten metal of the later passes.

Figure 4:
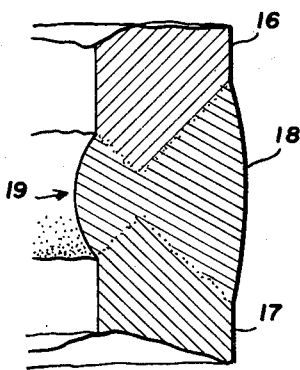
Fig. 4 shows a cross sectional view of a weld completed in accordance with the teachings of the present invention.

A completed weld will have the cross-sectional appearance as shown in Fig. 4 where cross hatching at 16 and 17 indicates the pipe ends while cross hatching at 18 indicates the weld at the outside of the pipe and at 19 indicates the weld at the inside of the pipe. A smooth beaded root surface (19) is obtained as determined by the shape of the backing relief. The root bead has dimensions of a known size as contrasted to the irregular interior projection or incomplete fusion of the root as would most probably result without the shaping cavity 15.

With the pipe ends prepared for welding as described above the welding thereof becomes a job which can be performed without difficulty by the average welder.

Figure 5:
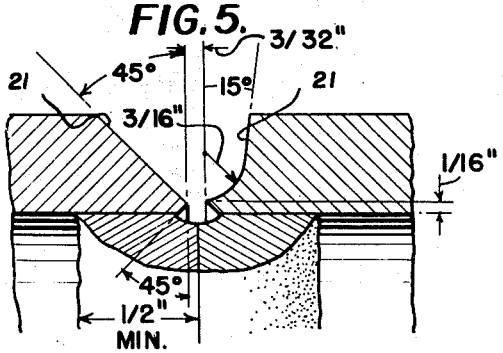

To assist in the maintenance of a constant crater size during the welding operation, principles set forth in the Patent 2,188,927 may be employed to advantage as shown in Fig. 5. In Fig. 5 one pipe end is shown with bevels or tapers as described previously but the other pipe end is cut back to a half-U-shape 20 instead of an angular bevel 21. In welding the joint thus prepared, the heat is directed against the angular face 21 at such distance along the slope thereof as to obtain the desired heat concentration and size crater. If the crater is too large the rod is moved up on the slope away from the knife or feathered edges; and if the crater is too small the rod is moved down on the slope toward the knife or feathered edges. The opposing wall being of a U-shape gives a much better control of heat than when both walls are angular as in Figs. 1–4.

Typical specifications of the pipe ends (Fig. 5)

where the wall thickness is heavier than ¼" are:

Bore angle—45°.
Bore depth—1/16" (measured on radius).
Angular face—45°.
U-face at bottom—1/16" radius for 90° measured from end of pipe. (Center of curvature in plane of end of pipe.)
U-face above 1/16" radius—15° angle from perpendicular
Spacing of pipe ends—3/32".

Figure 6:
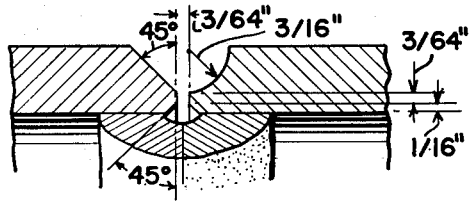

The above will best be modified slightly for optimum results with pipes having a wall thickness of ⅛" to ¼". A joint for such wall thickness is shown in Fig. 6 and is basically similar to that of Fig. 5 just described except that with the smaller beads used on thin material it has been found advantageous not to bore a full 1/16" to a knife edge but rather to bore only 3/32" and bevel down from the outside leaving a 3/64" flat portion at the end of the pipe which is neither beveled nor bored. If desired one pipe end can be made in a U-shape in which case it would be cut back on a 1/16" radius as shown rather than being beveled. It is desirable for such thickness to reduce the spacing between the pipe ends to 3/64" instead of the 3/32" spacing used for larger pipe.

Typical specification for ⅛" to ¼" wall thickness as follows:

Bore angle—45°
Bore depth—3/32" (measured on radius)
Angular face—45°
U-face 1/16" radius. (Center of curvature in plane of end of pipe.)
Spacing of pipe ends—3/64"
Flat end—3/64" thick.

Figure 7:
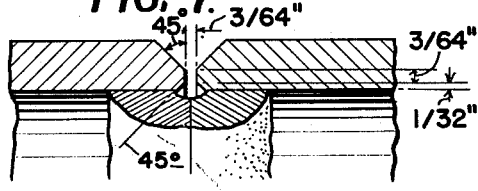
Figs. 5, 6, and 7 show views of alternate forms of joints prepared in accordance with the teachings of the present invention.

A still different design provides optimum results for pipe having a wall thickness between 5/64" and ⅛". A pipe end in partly cut-away cross sections is shown for this size range in Fig. 7. This design is quite similar to that shown in the previously discussed Fig. 6, however the thickness is such that there is little to be gained by using a U-shaped end for one of the pieces to be joined. Both ends are therefore shown identical. For this pipe thickness it is desirable to employ pipe end identical spacing of 3/64".

Typical specifications for wall thickness between 5/64" and ⅛":

Bore angle—45°
Bore depth—3/32" (measured on radius)
Angular face—45°
Spacing of pipe ends—3/64"
Flat end—3/64" thick.

The welding joint and backing arrangement described in the foregoing paragraphs permits the fabrication of welded joints in pipe or other hollow members with a new degree of ease and accuracy and a much greater assurance of uniformity and strength than hitherto possible. It should be understood, of course, that the foregoing disclosure relates only to preferred embodiments of the invention and that numerous modifications or alterations may be made therein without departing from the spirit and the scope of the invention as set forth in the appended claims.

What is claimed is:

1. A method of butt welding for joining the ends of tubular members with an inside bead comprising, angularly boring the ends to be joined to a depth approximately half the thickness of a welding bead, beveling the outside of the tubular ends to be joined, coating the inner surface of the tubes at the ends to be joined with a mouldable refractory backing which will solidify after application, cutting the backing after solidification thereof to a uniform planar surface projecting beyond the tubular end, relieving the backing in the region of the end boring, butting together the tube ends to be joined by welding, filling with weld metal the spaces thus formed at the tube ends, and subsequently removing the backing.

2. A method of butt welding for joining the ends of tubular members with an inside bead comprising, angularly boring the ends to be joined to a depth approximately half the thickness of an individual welding bead, beveling the outside of the tubular ends to be joined to form a feather edge with the angularly bored portion, coating the inner surface of the tubes at the ends to be joined with a mouldable backing projecting the end of the tube by an appreciable amount, said backing consisting of a refractory material together with a plastic binder which will solidify after application, cutting the backing after solidification thereof to a uniform planar surface projecting beyond the tubular end, relieving the backing in the region of the end boring, butting together the projecting backings of the tube ends to be joined by welding, filling with weld metal the space thus formed between the tube ends at the butted ends, and subsequently removing the backing.

3. A method of butt welding for joining the ends of tubular members with an inside bead comprising, convexly shaping the ends to be joined, coating the inner surface of the tubes at the ends to be joined with a mouldable backing, cutting the backing to a uniform planar surface projecting beyond the tubular end, beveling the backing at the end thereof, butting together the ends to be joined, filling with weld metal the spaces thus formed at the tube ends, and subsequently removing the backing.

4. A welding arrangement for joining two tubular members comprising, first and second adjacent tube elements having exteriorly cut back faces approximating a forty-five degree bevel and extending inwardly through a major fraction of the thickness of the tube walls, an interiorly cut back face on at least one said tube element extending substantially throughout the remaining fraction of the tube wall thickness, thereby to leave a thin V-shaped portion having the apex thereof extending toward the other said tube element, a plastically formed ring member within each respective adjacent end of the tube members and comprised of granular refractory matter bonded with self-setting thermally disintegrable material, said ring members being provided with planar faces respectively perpendicular to the tube element axes and displaced therealong beyond said V-shaped portion less than half of the diameter of a welding electrode adapted for welding the elements, and each said ring being provided with an annular cut away portion adjacent said face to which contiguous.

5. The welding arrangement of claim 4 wherein one said exterior face is cut back beyond said forty-five degree bevel to provide a thinner root material at the lower portion of the face whereby additional control of the area of molten material is achieved.

6. The arrangement of claim 4, both adjacent tube ends having said cut back interior faces and said rings having said annular cut away portions substantially longitudinally coextensive with the interior tube face cutway portions thereby defining a slag channel of large relative volume and symmetrical about said planar faces.

7. A welding arrangement for joining first and second tube elements coaxially comprising, a first said element having an exteriorly beveled face at one end thereof extending throughout substantially more than half of the tube wall thickness and having an interiorly beveled face within said outer beveled face extending substantially less than half of said wall thickness, a second tube element having similar beveled faces placed adjacent said first tube element beveled faces, a pair of plastically formed ring members of granular refractory material bonded with a self-setting thermally disintegrable material cast within said tube ends, said rings being provided with planar faces perpendicular to the axis of said tubes when coaxially disposed, each said face extending within and axially beyond each said beveled tube and by a distance not exceeding one half of the diameter of a welding rod adapted for electrical welding said two elements, and an annular beveled face joining said planar face and said interior beveled face on each tube element at the interior diameter thereof, whereby when said planar faces are placed in juxtaposition a slag channel is formed between each said ring and the corresponding tube face the metallic ends of the tube elements being disposed for welding at a distance apart no greater than said welding rod diameter.

BELA RONAY.

REFERENCES CITED

The following references are of record in the file of this patent:

UNITED STATES PATENTS

| Number | Name | Date |
|---|---|---|
| 1,990,077 | Kershaw | Feb. 5, 1935 |
| 2,066,569 | Kinkead | Jan. 5, 1937 |
| 2,122,994 | Southgate | July 5, 1938 |
| 2,188,925 | Ronay | Feb. 6, 1940 |
| 2,294,650 | Bechtle | Sept. 1, 1942 |